Sept. 24, 1968　　　L. F. JEZEK, JR　　　3,402,537
FLEXIBLE FEED REEL FOR COTTON STRIPPERS
Filed July 23, 1965　　　　　　　　　　3 Sheets-Sheet 1

INVENTOR.
LOUIS F. JEZEK, JR.
BY
Berman, Davidson & Berman
ATTORNEYS.

Sept. 24, 1968   L. F. JEZEK, JR   3,402,537
FLEXIBLE FEED REEL FOR COTTON STRIPPERS
Filed July 23, 1965   3 Sheets-Sheet 2

INVENTOR.
LOUIS F. JEZEK, JR.
BY
Berman, Davidson & Berman
ATTORNEYS.

Sept. 24, 1968  L. F. JEZEK, JR  3,402,537
FLEXIBLE FEED REEL FOR COTTON STRIPPERS
Filed July 23, 1965  3 Sheets-Sheet 3
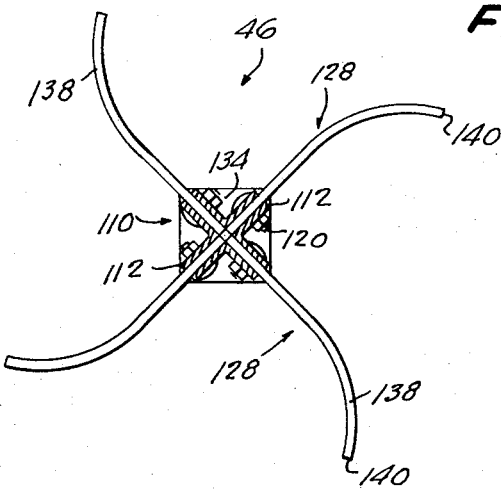
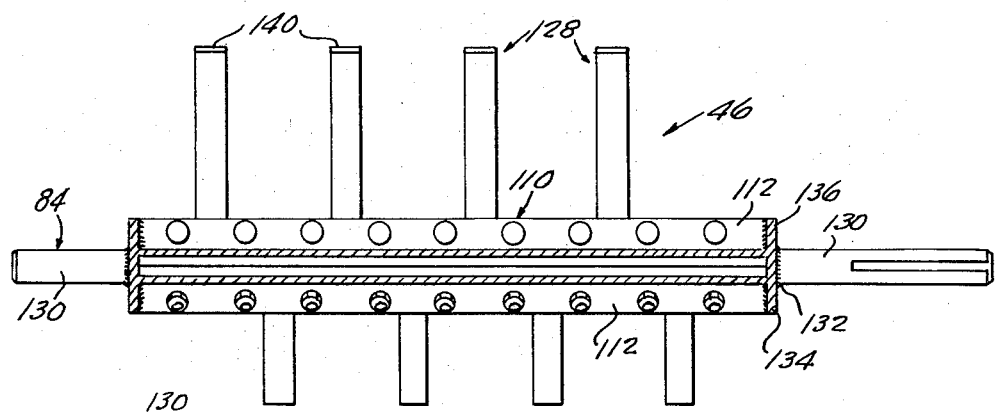
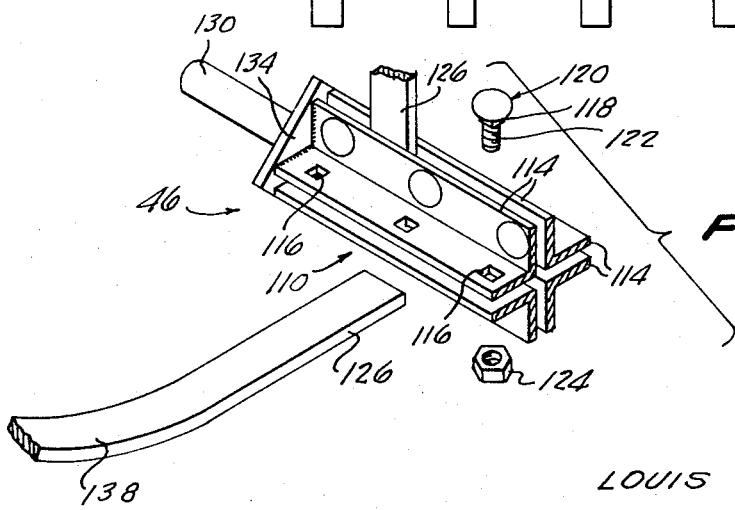
INVENTOR.
LOUIS F. JEZEK, JR.
BY
Berman, Davidson & Berman
ATTORNEYS.

United States Patent Office 3,402,537
Patented Sept. 24, 1968

3,402,537
FLEXIBLE FEED REEL FOR COTTON STRIPPERS
Louis F. Jezek, Jr., Rte. 3, Box 204,
Temple, Tex. 76501
Filed July 23, 1965, Ser. No. 474,372
1 Claim. (Cl. 56—34)

ABSTRACT OF THE DISCLOSURE

A flexible feed reel for a cotton stripper. The reel consists of a hub made up of four angle irons arranged with their corners inward and their flanges extending outwardly to define four pairs of spaced opposing flanges, the angle bars being rigidly-secured by transverse end plates with aligned shaft elements fixed thereto. Flexible prongs are clamped between the pairs of opposing flanges, the prongs being spaced longitudinally on the hub, and diametrically-opposed sets of prongs being staggered relative to each other. The prongs have arcuate end portions curved in a direction opposite to the direction of rotation of the reel.

---

This invention relates to a flexible feed reel for cotton strippers.

The primary object of the invention is the provision of a more efficient and practical cotton stripper of the type having stripping fingers wherein a cotton feeding reel overlies the stripping fingers.

Another object of the invention is the provision of a cotton stripper of the character indicated above, wherein the feeding reel is composed of a bolt-assembled hub in which the resilient tines are clamped, for selective adjustments of their tips toward and away from the stripping fingers, the adjustments being simple and being adapted to be accomplished easily and quickly by means of an ordinary wrench.

In the drawings:

FIGURE 3 is an enlarged vertical longitudinal section, taken on the line 3—3 of FIGURE 2;

FIGURE 4 is a similarly enlarged vertical transverse section, taken on the line 4—4 of FIGURE 1;

FIGURE 5 is a fragmentary exploded perspective view of the feeder reel.

Figure 1:
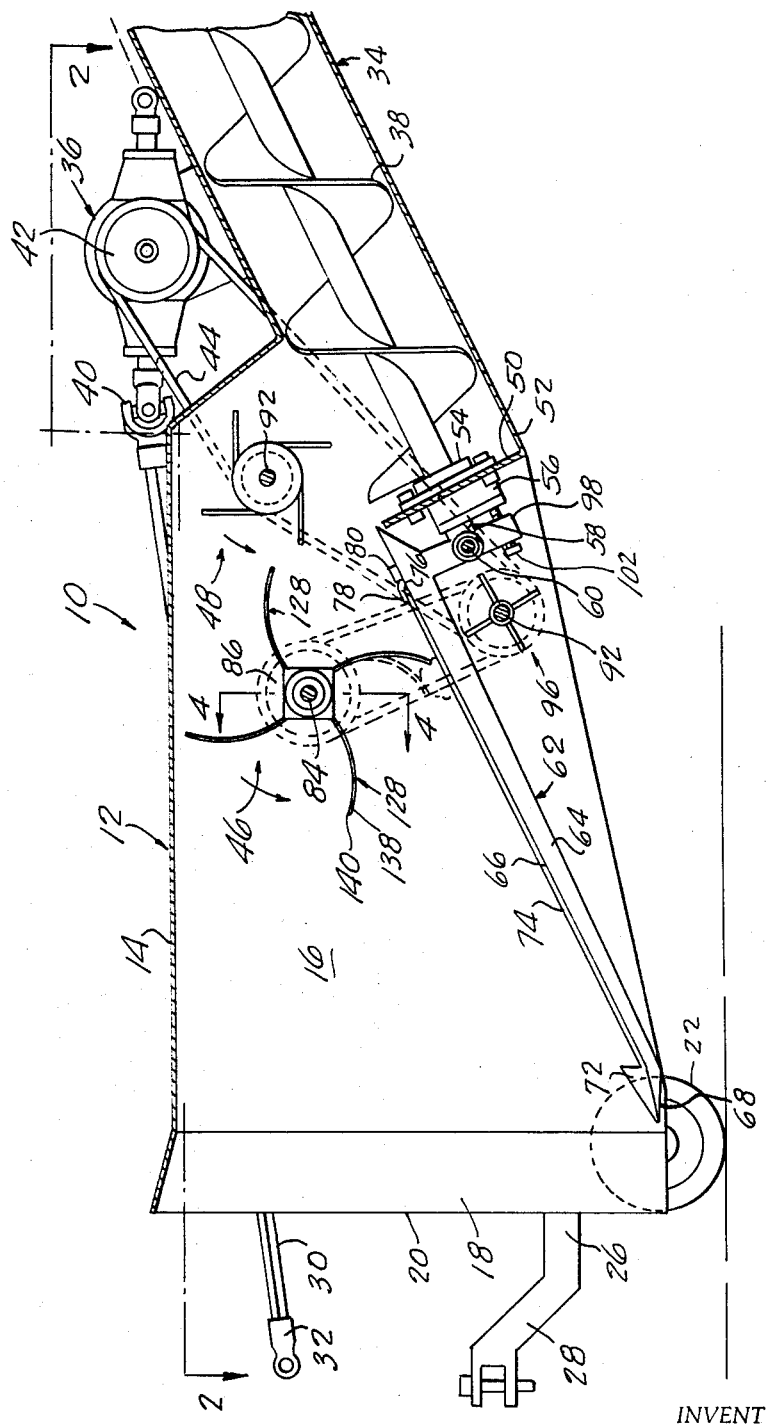
FIGURE 1 is a fragmentary vertical longitudinal section, taken through a unit of a cotton stripper of the invention.

Referring in detail to the drawings, a unit 10 of a cotton stripper is shown, which comprises a horizontally-elongated open-bottom housing 12, having a top wall 14, and sidewalls 16, these walls terminating at their forward ends in flared portions 18 which define an open front end 20 for the housing 12.

The housing 12 is supported above ground level, as by means of forward ground-engaging wheels 22, and a lateral horizontal transverse bar 24 fixed to a housing sidewall 16, and carried by a longitudinal beam 26 which terminates at its forward end in a drawbar 28 adapted to be secured to a tractor (not shown). A longitudinal power shaft 30 overlies the beam 26 and has a joint 32 on its forward end which is adapted to be connected to a power take-off on the tractor.

The housing 12 is reduced in cross-section at its rear end, to a rearwardly and upwardly-angled cylindrical conveyor tube 34 which is supported on a lateral arm 35 extending from a support for a differential housing 36, the tube 34 containing an auger conveyor 38 which reaches forwardly and to the rear part of the housing 12.

The power shaft 30 is operatively-connected at its rear end, as indicated at 40, to a component of a differential in housing 36. A lateral pulley 42, mounted on a laterally-extending shaft of the differential, adjacent to the unit 10, has trained therearound a drive belt 44 which is also trained around pulleys which drive a forward cotton-feeding rotor 46 and a rear agitator rotor 48 disposed within the rear part of the housing 12.

An upstanding and forwardly-inclined wall 50 extending across the interior of the housing 12, rises from the bottom wall 52 of the auger tube 34, on which the forward end of the auger 38 is journaled, as indicated at 54.

A block 56 is fixed to the forward side of the wall 50 and bearing brackets 58 at the ends of the block 56, extend forwardly therefrom and carry a transverse horizontal shaft 60 extending therebetween and spaced above the bottom of the housing 12.

A plurality of laterally-spaced stripping fingers 62 extend forwardly and downwardly within the lower part of the housing 12, between the block 56 and the forward end of the housing. Each finger 62 comprises a fixed, straight, rigid member 64 of substantial cross-section, having a flat upper surface 66 and has, at its forward end, a short horizontal under part 68. The rigid members have symmetrically-tapered forward end portions 70, having fixed thereon upstanding flat, longitudinally-centered, rearwardly-flared fins 72.

The stripping fingers 62 further comprise resilient, flat, relatively thin and flexible members 74 which overlie and bear upon the flat upper surfaces 66 of the rigid members 64, the resilient members being normally centered with respect to the rigid members, and extending equally to opposite sides of the rigid members. The resilient members 74 are suitably fixed at their forward ends upon the forward end portions of the rigid members 64, but are not fixed at their rear ends to the rigid members.

As shown in FIGURE 1, the rear ends 76 of the resilient members 74 are retainably-engaged beneath upset flanges 78 of blocks 80 which are fixed upon the upper surfaces of the rigid members 64. This arrangement enables the flexible members 74 of adjacent stripping fingers 62 to be spread away from each other, by the wedging therebetween of obstructions, such as rocks. Relatively small obstructions entering between adjacent flexible members 74 along with cotton bolls as the unit 10 travels forwardly, can discharge onto the ground. However, larger and hard obstructions can become securely wedged between resilient members, and can remain so rigid unless positively pushed downwardly. For this latter purpose, a feeding reel 46 is provided.

The feeding reel 46 is located above and over the rear portions of the stripping fingers 62, and is fixed on a horizontal transverse shaft 84 which is journaled through the sidewalls 16 of the housing. The shaft 84 has a pulley 86 on one end over which is trained a belt 88 which is also trained over a pulley 90 on an intermediate transverse shaft 92. The intermediate shaft 92 carries another pulley 94 over which is trained the drive belt 44.

As shown in FIGURE 1, the intermediate shaft 92 is located beneath the rear portions of the stripping fingers 62, and carries an agitator rotor 96. The rigid members 64 of the stripping fingers 62 have, adjacent to their rear ends, downwardly-extending arms 98 which are journaled intermediate their ends on the shaft 60, the arms 98, and hence, the fingers 62 being resiliently-spaced from each other by means of coil springs 100 circumposed on the shaft 60. The forward tilt of the fingers 62 is determined by adjustments of bolts 102 threaded through the lower parts of the arms 98 and bearing, at their rear ends, against the block 56.

The drive belt 44 is also trained around a pulley 104 on a horizontal transverse shaft 106 which is journaled across the rear part of the housing 12, at a location behind the block 56, and spaced thereabove and above the forward end of the auger 38, which carries the agitator rotor 48.

The feeding rotor 46, as shown in FIGURES 3 to 5, comprises a hub 110 which is composed of four angle irons 112 having flat flanges 114 which are formed with longitudinally-spaced polygonal openings 116 in which are engaged the polygonal shank portions 118 of bolts 120, and the threaded shank portions 122 of the bolts, which are provided with clamping nuts 124.

Substantially midway between bolts 120 there are engaged the straight inner end portions 126 of flat resilient prongs or tines 128. While a certain number of prongs 128 are shown, this number can be reduced or increased in accordance with the size and character of cotton bolls to be handled.

Figure 2:
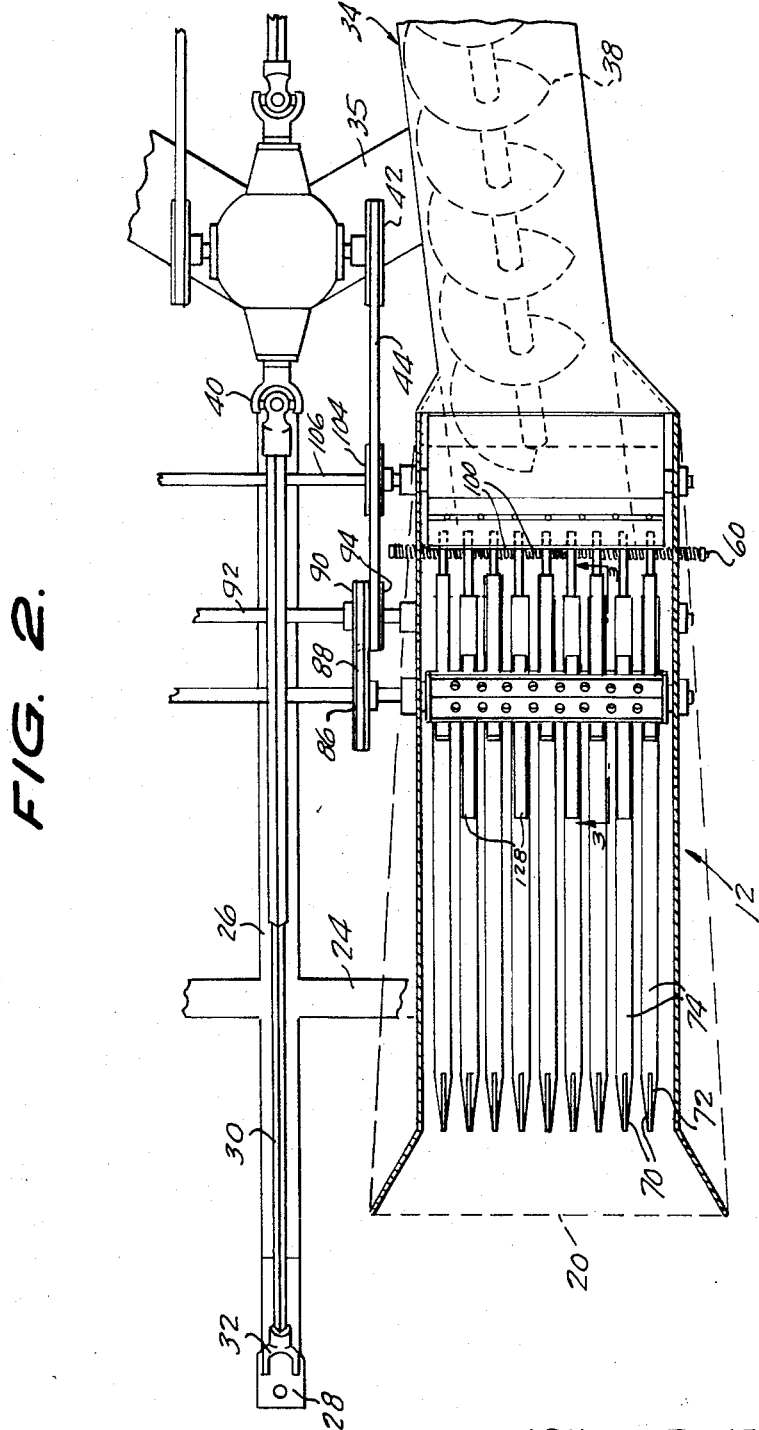
FIGURE 2 is a horizontal section taken on the line 2—2 of FIGURE 1.

The tines 128 clamped between the four opposed pairs of hub flanges 114 are spaced therealong, at equal distances, and are staggered so that, as shown in FIGURE 2, around the hub 110, diametricaly-opposed pairs of prongs have their inner end portions adjacent to each other. The rotor shaft 84, as shown in FIGURES 4 and 5, is composed of portions 130 which are fixed as by weldings 132, to end plates 134 which are, in turn, fixed as by weldings 136 to the ends of the angle irons 112, whereby the angle irons 112 are fixedly assembled to form the hub 110.

The inner end portions of the tines or prongs 128, as shown in FIGURES 1 and 4, extend diametrically with respect to the hub 110, and merge at their outer ends into arcuate outer end portions 138 which curve rearwardly relative thereto and have squared tips 140 which run close to the upper surfaces of the flexible members 74 of the stripping fingers 62.

In operation, as indicated by arrows in FIGURE 1, the feeding reel 46 rotates in a counterclockwise or forward direction, so that as cotton bolls arrive between adjacent fingers 62, in the areas of the tips 140 of the prongs 128, the bolls are positively moved and thrown rearwardly into the rear part of the housing. The upper agitator rotor 48, turning in the same direction as the feeding reel 46, then acts to throw the airborne bolls downwardly onto the auger 38. The auger 38 then acts to move the bolls rearwardly through the auger tube 34 to a place of disposal.

In the event that obstructions of substantial size and hardness move rearwardly between adjacent stripping fingers 62, and would otherwise become wedged therebetween, despite the yieldability of the resilient members 74 of the fingers 62, the convex sides of the outer end portions 138 of the prongs 128 engage the obstructions and push the obstructions from between the resilient finger members and discharge the same onto the ground. In the event that such obstructions are not dislodged by this action, the arcuate end portions 138 of the prongs 128 flex and yield and harmlessly pass over the obstructions.

What is claimed is:

1. A cotton feeding reel adapted to be supported above and across the stripping fingers of a cotton stripper, said feeding reel having longitudinally and circumferentially-spaced resilient prongs, means rotating said reel in a direction to feed cotton from the fingers toward one end of the fingers, the prongs of the reel having arcuate outer end portions curved in a direction opposite to the direction of rotation of the reel, said prongs having squared ends running close to the upper surfaces of the resilient members of the fingers, said reel having a hub comprising four angle irons having flanges, end plates fixed to the ends of the flanges, said end plates having aligned shaft portions fixed thereto, said flanges being arranged in opposed pairs, the flanges of the pairs being in spaced relationship, said prongs having inner end portions engaged between opposed flanges, and clamping bolts traversing opposed flanges between prongs.

References Cited

UNITED STATES PATENTS

| 2,544,411 | 3/1951 | Altgelt | 56—30 |
| 2,691,862 | 10/1954 | Johnson | 56—34 |
| 3,067,561 | 12/1962 | Jezek | 56—34 |

FOREIGN PATENTS

| 970,618 | 9/1964 | Great Britain. |

RUSSELL R. KINSEY, *Primary Examiner.*